(12) United States Patent
Asano

(10) Patent No.: US 6,994,540 B2
(45) Date of Patent: Feb. 7, 2006

(54) INJECTION MOLDING SYSTEM AND PELLET FEEDING UNIT

(75) Inventor: Tsuyoshi Asano, Kobe (JP)

(73) Assignee: Haruna Co., Ltd., Osaka (JP)

( * ) Notice: Subject to any disclaimer, the term of this patent is extended or adjusted under 35 U.S.C. 154(b) by 188 days.

(21) Appl. No.: 09/988,499

(22) Filed: Nov. 19, 2001

(65) Prior Publication Data

US 2002/0068104 A1 Jun. 6, 2002

Related U.S. Application Data

(63) Continuation-in-part of application No. 09/367,936, filed as application No. PCT/JP98/05962 on Dec. 25, 1998, now abandoned.

(30) Foreign Application Priority Data

Dec. 25, 1997 (JP) ............................................. 9-370190
Apr. 27, 1998 (JP) ........................................... 10-153481
Dec. 4, 1998 (JP) ........................................... 10-376441

(51) Int. Cl.
*B29C 45/63* (2006.01)

(52) U.S. Cl. ....................... 425/203; 425/546; 425/587; 366/76.3; 366/76.93

(58) Field of Classification Search ................ 264/40.1, 264/40.4, 102, 328.14, 328.17, 37, 349; 425/203, 425/587, 145, 140, 551, 546; 366/76.2, 76.93, 366/76.3
See application file for complete search history.

(56) References Cited

U.S. PATENT DOCUMENTS 4,591,475 A * 5/1986 Tomka et al. .......... 264/328.14
4,632,564 A * 12/1986 Kopernicky .................. 366/75
4,636,084 A * 1/1987 Kopernicky ................ 366/76.9
5,098,275 A * 3/1992 Kasai et al. ................. 425/145
5,385,462 A * 1/1995 Kodama et al. ............. 425/135
5,534,204 A * 7/1996 Aoki et al. .................. 264/102
6,187,229 B1 * 2/2001 Takayama et al. .......... 264/1.33

FOREIGN PATENT DOCUMENTS

| DE | 19646432 | * | 5/1997 |
| JP | 4-282215 | * | 10/1992 |
| JP | 5-64826 | * | 3/1993 |
| JP | 7-2182 | | 1/1995 |
| JP | 9-225964 | | 9/1997 |

* cited by examiner

*Primary Examiner*—Jill L. Heitbrink
(74) *Attorney, Agent, or Firm*—Armstrong, Kratz, Quintos, Hanson & Brooks, LLP.

(57) ABSTRACT

In a conventionally used injection molding apparatus, undried resin pellet is put in a drier of a predetermined temperature and water and gas in the undried resin pellet is completely removed, and the dried pellet deprived of water and gas is thrown into the injection molding apparatus. It is therefore necessary to carefully control quality of water and gas of pellet before pellet is thrown into the injection molding apparatus. In injection molding of undried resin pellet, evaluate injected resin, control operation conditions such as the feeding amount of pellet and the decompression degree, and determine the best operation conditions and the best accumulation amount wherein excellent articles are obtained. The accumulation amount of pellet fed in an injection molding chamber is detected, and feeding to the injection molding chamber is controlled upon the detection information. In the process of melting of the injection molding chamber, water and gas vaporized from pellet is discharged to the atmosphere under decompression.

7 Claims, 3 Drawing Sheets

US 6,994,540 B2

INJECTION MOLDING SYSTEM AND PELLET FEEDING UNIT

This application is a Continuation in Part of prior application Ser. No. 09/367,936, filed Aug. 24, 1999, now abandoned, which was the 35 USC 371 National Stage of International Application No. PCT/JP98/05962, filed Dec. 25, 1998.

FIELD OF THE INVENTION

The present invention relates to an injection molding apparatus, an injection molding system, a pellet feeding unit, a method for injection molding, and an injection molding product for injection molding using resin pellets, especially undried resin pellets.

BACKGROUND OF THE INVENTION

In a conventional injection molding apparatus, resin pellets are previously dried for some days by a drier of a predetermined temperature. The resin pellets are thus turned into a predetermined dried condition. While they are dried, water in the resin pellets is reduced to a predetermined value. The dried pellets with water of the predetermined value are thrown into the injection molding apparatus. In other words, the water in the resin pellets is carefully controlled before they are thrown into the injection molding apparatus.

An injection molding product has blowholes. This means that the conventional drying method is insufficient. It is considered that they are caused by water generated from chemical combinations of resin ingredients in pellets due to heating. Resin materials which constitute pellets and chemicals which are used for plasticizer generate vapor and gas due to heating. Chemicals in pellets are generated as poisonous gas in the process of melting in the injection molding apparatus. The generated poisonous gas is discharged into the atmosphere.

In these days, it is an issue of wide importance that human bodies are influenced by harmful objects, especially objects that distract internal secretion (environmental hormone), included in plastic. It is therefore socially important to prevent discharging these poisonous materials into the atmosphere.

This invention was made to solve the foregoing problems, and is aimed to remove harmful objects generated when resin pellets are melted in the injection molding apparatus, improve the quality of the products, reduce the inferior goods for at least 20% than before, and reduce frequency of maintenance for cleaning the inside of the die. Consequently, the productivity is increased and the electric energy required for injection molding is considerably decreased.

DISCLOSURE OF THE INVENTION

A method for injection molding according to the invention comprises a process of conducting a first injection by feeding undried resin pellets into a cylinder of an injection molding apparatus and a process of conducting a injection molding by means of a injection with a best accumulation amount per unit shot obtained by checking quality of a resin purge injected after a predetermined time from the first injection.

A method for injection molding according to the invention comprises: (a) a process of decompressing a gas exhaust passage in order to exhaust water and gas discharged from a die and/or water and gas discharged from pellets melted in a cylinder of an injection molding apparatus; (b) a process of conducting a first injection by feeding undried resin pellets through a pellet feeding passage to the cylinder of the injection molding apparatus; (c) a process of examining quality of a resin purge injected after a predetermined time from said first injection; (d) a process of determining a best accumulation amount per unit shot as a result of said examination; and (e) a process of conducting injection molding with said best accumulation amount.

A method for injection molding according to the invention comprises: (a) a process of decompressing a gas exhaust passage in order to exhaust water and gas discharged from a die and/or water and gas discharged from pellets melted in a cylinder of an injection molding apparatus; (b) a process of conducting a first injection by feeding undried resin pellets through a pellet feeding passage to the cylinder of the injection molding apparatus; (c) a process of examining quality of a resin purge injected after a predetermined time from said first injection; (d) a process of determining a best accumulation amount per unit shot as a result of said examination; (e) a process of detecting an accumulation amount of pellets fed during injection molding; (f) a process of controlling an accumulation amount of pellets upon said detection information; and (g) a process of conducting injection molding with said best accumulation amount.

A method for injection molding according to the invention comprises: (a) a process of decompressing a gas exhaust passage in order to exhaust water and gas discharged from a die and/or water and gas discharged from pellets melted in a cylinder of an injection molding apparatus; (b) a process of conducting a first injection by feeding undried resin pellets through a pellet feeding passage to the cylinder of the injection molding apparatus; (c) a process of examining quality of a resin purge injected after a predetermined time from said first injection; (d) a process of determining best operation conditions concerning operation conditions such as a feeding amount of pellets per unit shot, a decompression degree, and a pellet temperature as a result of said examination; and (e) a process of conducting injection molding under said best operation conditions.

A method for injection molding according to the invention comprises: (a) a process of decompressing a gas exhaust passage in order to exhaust water and gas discharged from a die and/or water and gas discharged from pellets melted in a cylinder of an injection molding apparatus; (b) a process of conducting a first injection by feeding undried resin pellets through a pellet feeding passage to the cylinder of the injection molding apparatus; (c) a process of examining quality of a resin purge injected after a predetermined time from said first injection; (d) a process of determining a best accumulation amount per unit shot as a result of said examination; (e) a process of controlling operation conditions such as a feeding amount of pellets, a degree of decompression, and a pellet temperature in order that said best accumulation amount exists in a pellet feeder; and (f) a process of conducting injection molding under said best operation conditions.

A method for injection molding according to the invention comprises: (a) a process of decompressing a gas exhaust passage in order to exhaust water and gas discharged from a die and/or water and gas discharged from pellets melted in a cylinder of an injection molding apparatus; (b) a process of conducting a first injection by feeding undried resin pellets through a pellet feeding passage to the cylinder of the injection molding apparatus; (c) a process of examining quality of a resin purge injected after a predetermined time from said first injection; (d) a process of determining a best accumulation amount per unit shot as a result of said examination; (e) a process of feeding pellets to said injection molding apparatus separately from water and gas exhausted from said pellets to be melted; and (f) a process of conducting injection molding under said best accumulation amount.

In the method for injection molding, the pellets of an accumulation amount in which pellets do not overflow from the cylinder of the injection molding apparatus even if pellets are continuously fed in the cylinder of the injection molding apparatus are fed as one shot in said examination process.

In the method for injection molding, the recommended value described in specifications or a pamphlet or a value obtained in an evaluation is used instead of the process of determining best operation conditions such as a feeding amount of pellets, a decompression degree, and a pellet temperature.

In the method for injection molding, the process of determining a best accumulation amount is conducted by changing operation conditions such as a feeding amount of pellets, a pellet temperature, and a decompression degree.

In the method for injection molding, the accumulation amount controlling process is controlled by changing the feeding amount.

In the method for injection molding, the accumulation amount controlling process is controlled by fixing the feeding amount and changing the feeding time.

In the method for injection molding, the feeding is stopped and started in said accumulation amount controlling process.

In the method for injection molding, the method further comprises a process of changing said detection position.

In the method for injection molding, the method additionally comprises an air feeding process for feeding air or gas such as an inert gas into said injection molding apparatus.

In the method for injection molding the dried pellets or recycled resin are used instead of said undried pellets.

An injection molding system according to the invention comprises: an injection molding apparatus for conducting a first injection by feeding undried resin pellets into a cylinder of an injection molding apparatus and injecting with a best accumulation amount per unit shot obtained by checking quality of a resin purge injected after a predetermined time from the first injection; a pellet feeding passage for feeding pellets into the cylinder of the injection molding apparatus; a gas exhaust passage for exhausting water and gas in resin discharged in said injection molding apparatus and/or a die; and a decompressor connected to said exhaust passage.

An injection molding system according to the invention comprises: an injection molding apparatus for conducting a first injection by feeding undried resin pellets into a cylinder of an injection molding apparatus and injecting with a best accumulation amount per unit shot obtained by checking quality of a resin purge injected after a predetermined time from the first injection; a pellet feeding passage for feeding pellets into the cylinder of the injection molding apparatus; a gas exhaust passage for exhausting water and gas in resin discharged in said injection molding apparatus and/or a die; a detector for detecting an accumulation amount of pellets fed during injection molding; a pellet accumulation amount controlling means for controlling an accumulation amount of pellets upon information of said detector; and a decompressor connected to said exhaust passage.

An injection molding system according to the invention comprises: an injection molding apparatus for conducting a first injection by feeding undried resin pellets into a cylinder of an injection molding apparatus and injecting with a best accumulation amount per unit shot obtained by checking quality of a resin purge injected after a predetermined time from the first injection; a pellet feeding passage for feeding pellets into the cylinder of the injection molding apparatus; a pellet feeding passage for feeding pellets into the injection molding apparatus; a gas exhaust passage for exhausting water and gas in resin discharged in said injection molding apparatus and/or a die; a device for preventing contact arranged at said pellet feeding passage in order to prevent pellets fed through said pellet feeding passage to said injection molding apparatus from contacting water and gas discharged from said injection molding apparatus; and a decompressor connected to said exhaust passage.

An injection molding system according to the invention comprises: a first injection molding apparatus for conducting a first injection by feeding undried resin pellets into a cylinder of an injection molding apparatus and examining quality of a resin purge obtained from injection after a predetermined time from the first injection; a second injection molding apparatus for injecting with a best accumulation amount per unit shot as a result of said examination; a pellet feeding passage for feeding pellets into the cylinder of the injection molding apparatus; a gas exhaust passage for exhausting water and gas in resin discharged in said injection molding apparatus and/or a die; a decompressor connected to said gas exhaust passage; a detector for detecting the fed accumulation amount; and a pellet accumulation amount controlling means for controlling the accumulation amount of pellet upon information of said detector.

In the injection molding system, the pellet accumulation amount controlling means controls at least one of operation conditions such as a feeding amount of pellets, a decompression degree, and a pellet temperature.

In the injection molding system, the pellet accumulation amount controlling means comprises a pellet feeding regulator and a system controller.

In the injection molding system, the system controller controls the decompressor and a pellet heater.

In the injection molding system, the pellet feeding regulator changes a feeding amount.

In the injection molding system, the pellet feeding regulator fixes a feeding amount and changes a feeding time.

In the injection molding system, the pellet feeding regulator stops and starts feeding.

In the injection molding system, the detector is arranged so that at least one detector is placed at a position of the best accumulation amount.

In the injection molding system, the system further comprises a heater for heating pellets to be fed to the injection molding apparatus.

In the injection molding system, the heater is a heat exchanger that utilizes warm gas discharged from the injection molding apparatus.

In the injection molding system, wherein said heater is placed at the pellet feeding passage.

In the injection molding system, the device for preventing contact is placed at the pellet feeding passage and comprises a pellet feeder in double structure so that pellets pass through a second pellet feeder of said pellet feeder and water and gas pass through a space between a first pellet feeder and the second pellet feeder.

In the injection molding system, the end of the second pellet feeder juts toward the injection molding apparatus beyond an end of the first pellet feeder.

In the injection molding system, the system further comprises a gas feeder for feeding air or gas such as an inert gas into said injection molding apparatus.

In the injection molding system, the dried pellets or recycled resin are used instead of said undried pellets.

An injection molding system according to the invention comprises plural injection molding apparatuses and one central control device, wherein said injection molding apparatuses conduct a first injection by feeding undried resin pellets to cylinders of the injection molding apparatuses and inject with a best accumulation amount per unit shot obtained by examining quality of a resin purge injected after a predetermined time from the first injection, and said one central control device controls feeding of pellets so that excellent articles are always obtained due to a result of examining a purge injected after some minutes from the first injected purge upon information of operation environment of each injection molding apparatus.

An injection molding apparatus according to the invention conducts a first injection by feeding undried pellets into a cylinder of the injection molding apparatus and injects with a best accumulation amount per unit shot obtained by checking quality of a resin purge injected after a predetermined time from the first injection.

In the injection molding apparatus, the apparatus comprises a pellet accumulation amount controlling means which controls at least one of operation conditions such as a feeding amount of pellets, a decompression degree, and a pellet temperature.

In the injection molding apparatus, the pellet accumulation amount controlling means comprises a pellet feeding regulator.

In the injection molding apparatus, the pellet feeding regulator changes a feeding amount.

In the injection molding apparatus, the pellet feeding regulator fixes a feeding amount and changes a feeding time.

In the injection molding apparatus, the pellet feeding regulator stops and starts feeding.

In the injection molding apparatus, the apparatus further comprises at least one detector placed at a position of the best accumulation amount.

A pellet feeding unit according to the invention comprises: a pellet feeding passage for feeding pellets into a cylinder of an injection molding apparatus in order to melt and inject undried resin pellets fed through the pellet feeding passage; a gas exhaust passage for exhausting water and gas in resin discharged in a die and/or the injection molding apparatus; a decompressor connected to said gas exhaust passage; a detector for detecting an accumulation amount of pellets fed during injection molding; a pellet accumulation amount controlling means for controlling the accumulation amount of pellets upon information of said detector; and a removing apparatus which is placed at said exhaust passage and removes harmful objects in warm exhaust gas discharged from the injection molding apparatus.

A pellet feeding unit according to the invention comprises: a pellet feeding passage for feeding pellets into a cylinder of an injection molding apparatus in order to melt and inject undried resin pellets fed through the pellet feeding passage; a gas exhaust passage for exhausting water and gas in resin discharged in a die and/or the injection molding apparatus; a decompressor connected to said gas exhaust passage; a device for preventing contact which is placed at said pellet feeding passage and prevents pellets fed through said pellet feeding passage into the cylinder of the injection molding apparatus from contacting water and gas in resin discharged from said injection molding apparatus; a detector for detecting an accumulation amount of pellets fed during injection molding; a pellet accumulation amount controlling means for controlling the accumulation amount of pellets upon information of said detector; a removing apparatus which is placed at said exhaust passage and removes harmful objects in warm exhaust gas discharged from the injection molding apparatus; and a heater for heating pellets to be fed to said injection molding apparatus.

In the pellet feeding unit, the pellet accumulation amount controlling means controls at least one of operation conditions such as a feeding mount of pellets, a decompression degree, and a pellet temperature.

In the pellet feeding unit, the pellet accumulation amount controlling means comprises a pellet feeding regulator and a system controller.

In the pellet feeding unit, the system controller controls the decompressor and the pellet heater.

In the pellet feeding unit, the pellet feeding regulator changes a feeding amount.

In the pellet feeding unit, the pellet feeding regulator fixes a feeding amount and changes a feeding time.

In the pellet feeding unit, the pellet feeding regulator stops and starts feeding.

In the pellet feeding unit, the detector is arranged so that at least one detector is placed at a position of a best accumulation amount.

An injection molding product is made by the method for injection molding, the injection molding system, the injection molding apparatus, or the pellet feeding unit.

DETAILED DESCRIPTION OF THE INVENTION

The present invention is substantially constructed as described below. Undried resin pellets are fed into a cylinder of an injection molding apparatus through a pellet feeding passage and a first injection is conducted, and quality of a resin purge injected after a predetermined time from the first injection is examined and a best accumulation amount per unit shot which results are good in the examination is determined. Injection molding is conducted with this best accumulation amount. An accumulation amount of pellets fed during injection molding is detected, and the accumulation amount of pellets is controlled on the basis of the detected information in order to keep the accumulation amount of pellets at the best value. Consequently, the cylinder of the injection molding apparatus always has the best accumulation amount per unit shot. Water and gas discharged from a die and/or water and gas discharged from pellets melted in the cylinder of the injection molding apparatus are exhausted to the atmosphere under decompression. The construction of the present invention is applicable to an injection molding apparatus, an injection molding system, a pellet feeding unit, and a method for injection molding.

The present invention will now be described in detail with reference to the accompanying drawings.

Resin pellets are conventionally dried in a drying oven for some days until the water is decreased to a fixed amount. In the preferred embodiment, undried resin pellets, which amount of water is not adjusted, are used instead of dried resin pellets.

Figure 1:
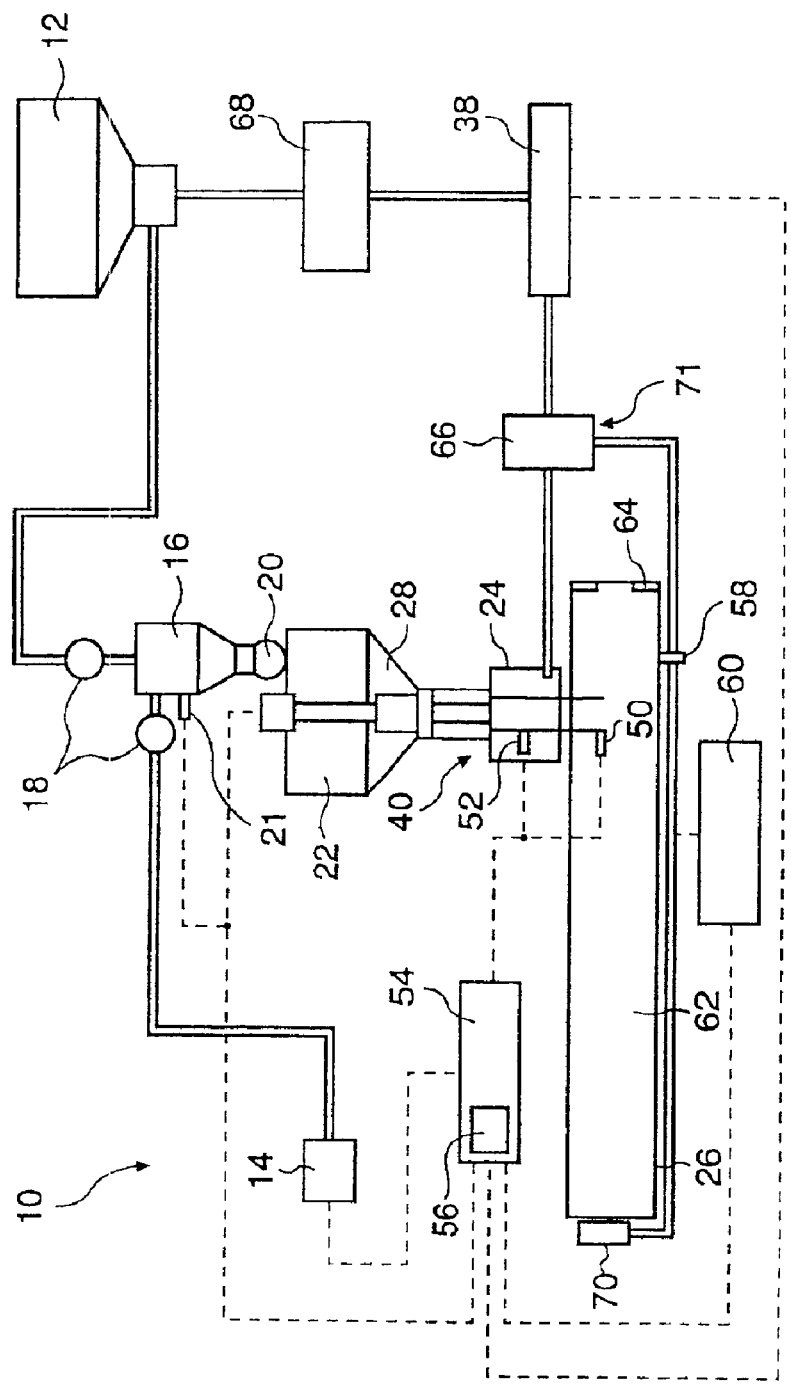
FIG. 1 is a schematic illustration of the injection molding system according to the present invention.

FIG. 1 shows a schematic illustration of an injection molding system. In the illustration, Reference number 10 is an injection molding system. 12 is a storage tank where resin pellets such as nylon are stored. Pellets are fed to a pellet storage 22 through an air-exhaust ventilator 14, an auto loader 16, and a vacuum interception valve 20 which compose a device for automatically feeding pellets. A vacuum interception valve 18 is arranged at each of a passage between the storage tank 12 and the auto loader 16 and a passage between the air-exhaust ventilator 14 and the auto loader 16. When pellets are moved to the auto loader 16, the vacuum interception valves 18 are shut.

Pellets are moved from the auto loader 16 to the pellet storage 22 through the vacuum interception valve 20. The auto loader 16 is provided with a level sensor 21 which detects a position of accumulation of pellets. The vacuum interception valve 20 shuts when pellets are moved from the auto loader 16 to the pellet storage 22. Then resin pellets are moved from the pellet storage 22 to an injection molding apparatus 26 through a pellet feeder 24.

The injection molding apparatus 26 melts pellets fed in a cylinder and injects melted resin from an injection hole arranged at an end thereof. The injection molding apparatus 26 feeds pellets into the cylinder and conducts a first injection, and injects according to the best accumulation amount per unit shot obtained by examining quality of a resin purge injected after a predetermined time from the first injection.

Figure 2:
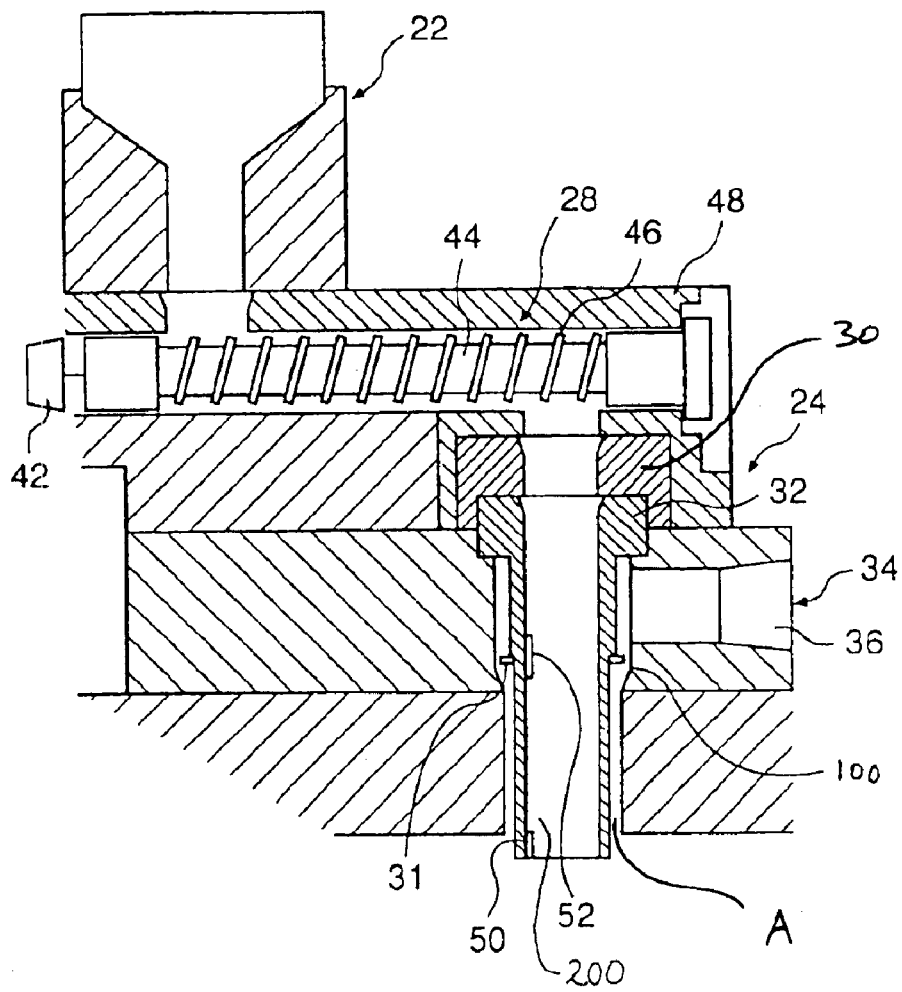
FIG. 2 is a schematic illustration of the pellet feeder according to the present invention.

As shown in FIG. 2, the pellet feeder 24 is provided with a pellet feeding regulator 28. The pellet feeder 24 is provided with first and second pellet feeders 30, 32. Pellets which amount was controlled by the pellet feeding regulator 28 are fed from the pellet storage 22 to the pellet feeder 24.

The pellet feeder 24 has double structure. In other words, the pellet feeder 24 has the first pellet feeder 30 of transparent acrylic and the second pellet feeder 32 of copper, placed in the first pellet feeder 30. An end of the second pellet feeder 32 juts toward the injection molding apparatus beyond an end of the first pellet feeder. Thus pellets pass the second pellet feeder 32, and water and exhaust gas pass the space outside the second pellet feeder 32. Reference number 31 is a net for removing dust in water and gas exhausted from pellets melted in the cylinder.

The first pellet feeder 30 and the second pellet feeder 32 placed in the first pellet feeder 30 construct a device for preventing contact. As depicted in FIG. 2, a gap corresponding to region "A" is a space located between first pellet feeder 30 and second pellet feeder 32. The first pellet feeder 30 has an exhaust port 36. The exhaust port 36 is connected to a decompressor 38 which is described later. A pellet feeding passage 40 is constructed as stated above.

Detectors 50, 52, which are described later, are attached to the second pellet feeder 32. It is preferable to arrange the detectors at the lower portion of the second pellet feeder 32.

The pellet feeding passage 40 described above is constructed as one body, but it is possible to make each component removable in consideration of maintenance and cleaning. The auto loader and the interior of the pellet storage are cleaned by slowing gas from the upper portion. Pellets rub each other while moving or dropping. As a result, pellets get static electricity. The static electricity generated on pellets disturbs smooth feeding of pellets. It is therefore preferable to arrange a static electricity prevention means (not illustrated) at the feeding passage from the storage tank to the pellet feeder. The static electricity prevention means is, for example, the earth.

Owing to the adjustment of feeding pellets by the pellet feeding regulator 28, the amount of pellets fed to the injection molding apparatus is variable, the feeding amount is fixed and the feeding time is variable, or the feeding is stopped and started. The pellet feeding regulator 28 has a motor 42. Owing to the adjustment of the feeding amount of pellets, the number of rotations of the motor is variable, the number of rotations of the motor is fixed and the time of rotation of the motor is variable (including stop), or rotations of the motor are stopped or started. The feeding amount of pellets is also variable owing to the decompression degree and the pellet temperature. The feeding amount of pellets, i.e. the accumulation amount of pellets, increases as the decompression degree becomes higher and increases as the pellet temperature becomes higher.

The pellet feeding regulator 28 in FIG. 2 is arranged transversely, and it can also be arranged longitudinally. The pellet feeding regulator 28 has a shaft 44, a spiral feeding portion 46 with a predetermined pitch, and the driving motor 42 at the other end thereof. The shaft 44 and spiral feeding portion 46 of the pellet feeding regulator 28 are placed in a housing 48. The driving motor is controlled on the basis of information from a detector described later. The amount of pellets fed through the spiral feeding portion is adjusted by controlling the number of rotations of the shaft connected to the motor. Besides the construction described above, it is possible to arrange various regulation mechanisms, for example a regulation blade for adjusting the diameter of the pellet feeding passage, to the pellet feeding regulator 28.

Reference number 50 and 52 are detectors, for example position sensors. The detectors 50 and 52 are attached to the second feeder 32, or a water jacket of the cylinder. The detector 50 detects a situation wherein pellets overflow the cylinder and come out to the second pellet feeder. The detector 52 detects a situation wherein pellets begin to be accumulated above a determined accumulation position in the second pellet feeder. When a detector operates, the information is sent to a system controller 54. The system controller 54 sends a signal for controlling the accumulation amount of pellets to the pellet feeding regulator on the basis of the information. Thus, the pellet feeding regulator 28 adjusts the feeding amount of pellets by adjusting the number of rotations of the motor 42, fixes the number of rotations of the motor 42 and adjusts the driving time, or stops and starts driving of the motor 42. Or a signal is sent from a pressure controller 56 in the system controller 54 to the air-exhaust ventilator 14, and the amount of pellets fed from the storage tank 12 is changed.

Moreover, a driving detector 58 which detects fluctuation of driving of a screw is arranged at one end of the screw. Reference number 60 is a device for controlling the injection molding apparatus that controls the injection molding apparatus such as movement of a screw arranged in an injection molding chamber 62 of the injection molding apparatus. Information of the injection molding apparatus controller 60 is sent to the system controller 54, and the whole injection molding system is controlled.

The foregoing injection molding apparatus has a heater in the circumference, an injection hole at an end, and a screw. The screw has a weighing zone, a compressing zone, and a feeding zone. The temperature of pellets rises to a uniform temperature along with self-generation of heat. In the compressing zone, pellets are melted and mixed. Due to this function, melted resin of a fixed amount is sent toward a nozzle. Pellets fed in the injection molding apparatus have cushion pressure when they are compressed by the screw. The range of fluctuation of the cushion pressure is arranged to be 5 mm±0.5 mm at most.

The inside of the injection molding apparatus can be kept hermetically, and it is also possible to introduce air of the atmosphere or an inert gas from another end of the injection molding apparatus. The means to feed gas is a mouth 64 arranged at another end opposing the injection hole of the cylinder of the injection molding apparatus. Instead of air, an inert gas can be introduced in the cylinder. Furthermore, it is preferable to heat the gas. The feeding amount of air in a conventionally used 50 ton injection molding apparatus of Fanuc Ltd. is approximately 200 Nl/min–approximately 300 Nl/min. Pellets fed from the pellet feeder to the injection molding chamber of the injection molding apparatus move in said chamber due to the screw, and water and gas in the pellets are discharged while melting. A gaseous body which includes the water and gas discharged from the pellets is thrown out of the injection molding apparatus owing to a vacuum pump consisting the decompressor 38. The decompressor 38 is attached around the lower portion of the second feeder 32. Thus the decompressor 38 sucks water and gas generated from melted pellets, and exhausts the water and gas to the atmosphere. The vacuum pump operates continuously during operation of the injection molding apparatus. The inside of the injection molding chamber or the inside of the feeder is arranged to be under decompression, of preferably about 40 Kpa (300 Torr) or more, preferably about 70 Kpa or more, and more preferably about 80 Kpa to 95 Kpa.

The gaseous body including the water and gas which were taken out is moved through a device for disposing exhaust gas 66 and the vacuum pump 38 to a pellet heater 68. The pellet heater 68 is a heat exchanger. The warm gaseous body from the injection molding apparatus is moved to the heat exchanger. On the other hand, air in the atmosphere is moved to the heat exchanger through a compressor (not illustrated). The air in the atmosphere is thus heated to approximately 80° C. when it passes the heat exchanger. The warm air is fed to the pellet storage tank 12. The interior of the storage is heated to approximately 40° C. by placing the foregoing heat exchanger 68 in the storage. When air from outside passes inside the storage, it is heated and moved to the heat ex changer 68. It is preferable to place the vacuum pump, device for disposing exhaust gas, and compressor in the storage.

It is preferable to dispose harmful objects included in water and gas in the warm exhaust gas using the device for disposing exhaust gas 71, such as a filter 66 before they get into the heat exchanger. The purified warm gaseous body is deprived of heat by the heat exchanger, and is discharged to the atmosphere. Undried resin pellets are thus heated in the pellet storage tank. The heated pellets are fed into the injection molding apparatus through the pellet feeding passage. Heating pellets is especially effective when undried resin pellets are used.

The heater of the pellet can be different in construction from the foregoing heater. For example, the purified warm gaseous body is directly introduced to the pellet feeding passage. It s possible to attach a heater such as a band heater to the pellet feeding passage. The amount of water discharged when pellets are heated by a heater such as a band heater is smaller than the amount of water discharged when melted in the injection molding apparatus. The amount of impure gas discharged by the former is smaller than the amount of gas discharged by the latter.

The second pellet feeder 32 of copper in FIG. 2 composes a second pellet heater. Warm gaseous body generated in the injection molding apparatus is discharged to the atmosphere by the decompressor. When the warm gaseous body passes the space outside and the second pellet feeder 32, the second pellet feeder 32 is heated by the warm gaseous body. Consequently, pellets are heated while they pass the heated copper feeder.

Next, melted resin injected from the injection hole of the injection molding apparatus is injected into a die 70 placed forward. The melted resin is hardened in the die 70, and an injection molding product is formed. Most of the gas and water in the injected resin are removed in the process melting in the injection molding apparatus, but a part of the gas and water that remain in the resin come into the die. In order to prevent water and gas from sticking to the inside of the die, the die is connected to the decompressor 38. Moreover, harmful objects discharged from the die is caught by the filter 66, and the harmful objects are removed. The decompressor compulsorily exhausts water and gas discharged from the injection molding apparatus and/or water and gas discharged from the die.

In this case, it is possible to use either the same vacuum pump for discharging gas and water in the injection molding apparatus or another vacuum pump. The vacuum pump removes water and gas discharged from the injection molding apparatus and/or the die under decompression. A pellet exhaust passage 71 is composed by a passage through which water and gas removed from the injection molding apparatus and/or the die under decompression are discharged to the atmosphere.

Figure 3:
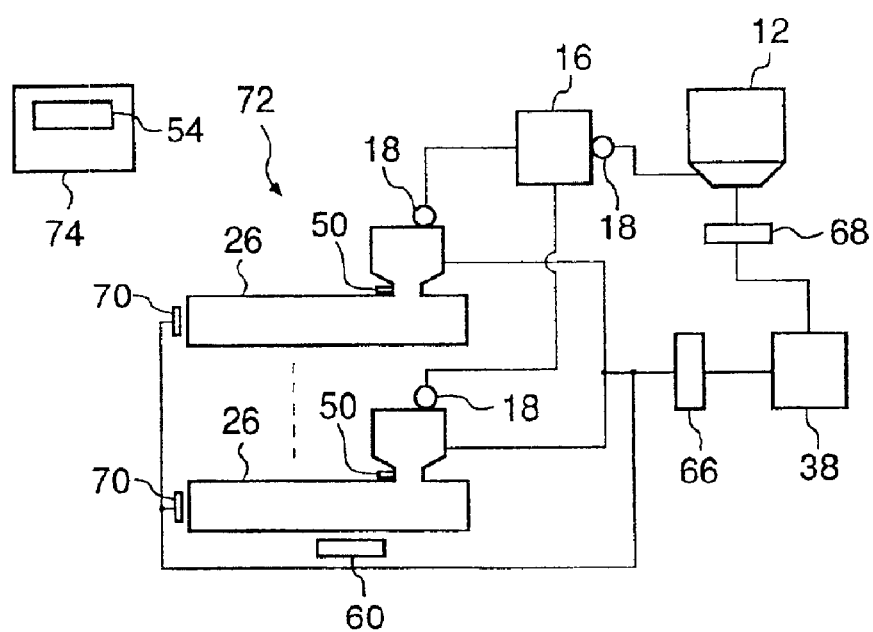
FIG. 3 is a schematic illustration of the injection molding system according to the present invention.

FIG. 3 shows a schematic illustration of an injection molding system 72. Plural injection molding apparatuses 26 are arranged in the illustration. Feeding pellets to each injection molding apparatus 26 is conducted by one central control device 74, which controls the feeding amount, operation parameter of the injection molding apparatuses, pressure for feeding, and heating control. Thus the injection molding system is unmanned and automatized by using one central control device.

The operation of the present invention is described below. The resin pellets fed to the injection molding apparatus according to the present invention are undried pellets which are not dried before they are fed to the injection molding apparatus. Instead of undried pellets, commonly used dried resin pellets and recycled resin can be used as the resin pellets.

In the present invention, undried resin pellets are fed into the injection molding apparatus. The injection amount per unit shot, for example per one shot wherein excellent articles are obtained varies due to the operation conditions such as the kind of resin material used as raw material of pellets, feeding amount of pellets, pellet temperature, and decompression degree under which water and gas inside the injection molding apparatus are discharged outside. In other words, the accumulation amount per unit shot of pellets fed into the cylinder of the injection molding apparatus varies.

Undried resin pellets made of a kind of resin material is fed into the cylinder of the injection molding apparatus and the operation conditions such as the feeding amount of pellets, pellet temperature, and decompression degree are determined. In this case, an accumulation amount, wherein pellets do not overflow from the cylinder of the injection molding apparatus even when pellets are successively fed into the injection molding apparatus, is fed as one shot.

Next, injection is conducted using the accumulated pellets for one shot. Then, the quality of the injected resin purge is examined or evaluated. The examination is performed with a resin purge injected after a predetermined time, for example 2–3 minutes, from the first injection of a resin purge is used. If an excellent article is obtained in this examination, the operation conditions for said feeding amount of pellets are determined. It is preferable to gradually increase the determined accumulation amount and obtain the threshold value of accumulation amount between inferior articles and excellent articles. It is preferable to gradually decrease the determined accumulation amount and obtain the threshold value of accumulation amount between inferior articles and excellent articles.

An accumulation amount between the determined accumulation amount and the threshold value of accumulation amount is the best accumulation amount. The optimal accumulation amount, from which a good product results, is one within about 10 mm from an upper end of the flight of a screw inside the cylinder. Operation conditions between the operation conditions such as the pellet feeding amount, pellet temperature, and decompression degree where the determined accumulation amount is obtained and the operation conditions such as the pellet feeding amount, pellet temperature, and decompression degree where the threshold value of accumulation amount is obtained are the best operation conditions. That is to say, injection molding of excellent articles is obtained when injection molding is conducted with an accumulation amount between the determined accumulation amount and the threshold value of accumulation amount. In this case, the best accumulation amount includes the determined accumulation amount and the threshold value of accumulation amount. Injection molding can be therefore conducted with the determined accumulation amount obtained in the foregoing evaluation without obtaining the threshold value of accumulation amount.

As a result of the examination, the best accumulation amount for a unit shot varies due to the operation conditions such as the kind of resin material, feeding amount of pellets, pellet temperature, and decompression degree. The best accumulation amount is obtained by changing at least one of the operation conditions such as the kind of resin material, feeding amount of pellets, pellet temperature, and decompression degree.

In the case of certain operation conditions such as a kind of resin material, a feeding amount of pellets, a pellet temperature, and a decompression degree, the best accumulation amount is in the cylinder (Case 1). In the case of other operation conditions such as another kind of resin material, another feeding amount of pellets, a pellet temperature, and a decompression degree, the best accumulation amount overflows the cylinder and comes to the position of the pellet feeder. It is therefore necessary to conduct injection molding with the best operation conditions for the best accumulation amount in order to obtain an excellent molding product.

When an amount above the best accumulation amount of pellets is injected, the resin purge becomes inferior. It is therefore important to control each of the operation conditions such as the kind of resin material, feeding amount of pellets, pellet temperature, and decompression degree not to exceed the best accumulation amount. For example, when the decompression is at least 300 Torr, the feeding amount is approximately 1 g/sec–approximately 7 g/sec. When the decompression is at least 100 Torr and the heating temperature is 60° C., the feeding amount is approximately 1 g/sec–approximately 10 g/sec.

A trouble often occurs in the driving process of the injection molding apparatus. The accumulation amount of pellets sometimes begins to increase above the best accumulation amount although injection molding is conducted under the best operation conditions. In such a case, the injection molding product becomes inferior although the best accumulation amount of pellets is continuously fed.

It is therefore necessary to control the accumulation amount of pellets to be always in the best value of accumulation amount. The accumulation amount of pellets is fundamentally controlled as follows. The feeding amount of pellets is changed. The feeding amount of pellets is fixed and the feeding time is changed. Feeding is stopped and started. Or the operation conditions such as the pellet temperature and/or decompression degree are changed.

In order to prevent pellets from accumulating over the best accumulation amount, the accumulation situation is controlled by using a detector, for example a position sensor. At least one detector is placed between the position of the determined accumulation amount and the position of the threshold value of accumulation amount. It is preferable to place the detector at a position between the position of the determined accumulation amount and the position of the threshold value of accumulation amount. Or detectors are placed at the determined position of the determined accumulation amount, the threshold value position of the threshold value of accumulation amount, and a position between these positions. It is preferable to decide the positions to place the detectors flexibly owing to the best accumulation amount. The detector is located within about 10 mm from an upper end of a flight of a screw inside the cylinder.

In the foregoing Case 1, the best accumulation amount is in the cylinder. In this case, it is preferable to arrange the detectors in the cylinder, but it is difficult to arrange the detectors in the cylinder. The detectors are therefore placed at the lowest portion of the pellet feeder, i.e. a place which is near the feeding mouth of the cylinder and is assumed to be the threshold value position of accumulation amount. When the accumulation amount of pellets comes to the position of the detector, feeding of pellets is temporarily stopped. When the accumulation amount of pellets begins to be lower than the position, feeding pellets under the best conditions or feeding of an optional amount is started.

In this case, said detector can be a counting sensor instead of a position sensor. The counting sensor counts the number of pellets passing a position in the pellet feeder in a unit time. In this case, the number of pellets per unit time wherein the best accumulation amount is obtained is determined beforehand, and when the number of pellets fed in the cylinder is above the number, the foregoing operation conditions are controlled to feed the best pellet number in the cylinder.

In the foregoing Case 2, the best accumulation amount is in the pellet feeder. In this case, the detector is arranged in the pellet feeder. The detector is placed at a position between the determined position of the determined accumulation amount and the position of the threshold value of accumulation amount. Or the detectors are placed at the determined position of the determined accumulation amount, the threshold value position of the threshold value of accumulation amount, and a position between these positions.

In the former case, when the accumulation amount of pellets comes to the position of the detector placed at the determined position, the accumulation amount is controlled in the foregoing fundamental controlling method. In the latter case, when the accumulation amount of pellets comes to the position of the detector placed at the determined position, the accumulation amount is controlled by the foregoing fundamental controlling method.

Especially when the accumulation amount of pellets comes to the position of the detector placed at the position of the threshold value, the accumulation amount is controlled by temporarily stopping feeding pellets, and feeding pellets under the best conditions or feeding of an optional amount is started when the accumulation amount of pellets becomes lower than said position. In this case, it is possible to control the accumulation amount with either of the foregoing two detecting methods. It is possible to use a counting sensor instead of a position sensor as the detector in this case too.

In the foregoing case, when pellets accumulate above the detector, the detector sends the information to the system controller, and a signal of feeding control is sent from the controller to the pellet feeding regulator. When this signal is sent, the pellet feeding regulator changes the feeding amount of pellets, fixes the feeding amount of pellets and changes the feeding time, or temporarily stops feeding. Consequently, pellets always accumulate at the best accumulation amount. The system controller controls the operation conditions such as the pellet temperature and the decompression degree to be in the best conditions.

The process of determining the best accumulation amount per one shot and the process of melting and injecting pellets of the foregoing best accumulation amount is conducted by the same injection molding apparatus or by a separate injection molding apparatus respectively.

In injection molding, it is possible to use the recommended value described in the specifications or the pamphlet or the value obtained in an advance evaluation test instead of the values of the best operation conditions such as the pellet feeding amount, pellet temperature, and depression degree where the best accumulation amount is obtained. In this case, it is possible to inject using said recommended values, but it is preferable to inject using the recommended value at first, examine the injected product with the foregoing evaluation method, and as a result of the evaluation, inject under the best operation conditions. The time to obtain the best accumulation amount and the best operation conditions is shortened by using these known values.

As described above, the accumulation amount of pellets is controlled for two purposes. One is controlling in order to determine the best accumulation amount per unit shot for obtaining an excellent resin purge. Another is controlling in order to make the accumulation amount of fed pellets always exist in the best accumulation amount per unit shot. In controlling the accumulation amount of pellets, for example, the foregoing pellet feeding regulator controls the feeding.

When pellets are melted in the cylinder of the injection molding apparatus, water and gas are discharged from the pellets. The present invention is con-posed to compulsorily expel the water and gas to the atmosphere. These water and gas are discharged to the atmosphere under decompression. Or these water and gas are discharged to the atmosphere under decompression along with air introduced from the atmosphere and an inert gas.

As described above, water and gas are discharged to the atmosphere under decompression. When a rising current of water and gas collides with dropping pellets, dropping of pellets is disturbed. Therefore pellets of the determined feeding amount are not fed to the injection molding apparatus. The present invention is composed to prevent contact of dropping pellets and a rising current of water and gas. A first area 100 where rising water and gas pass and a second area 200 where dropping pellets pass are separated. The first area where water and gas pass is connected to the decompressor. The member forming said second area is longer than the member forming said first area. This accurately prevents contact and accurately feeds pellets of the determined amount to the injection molding apparatus.

Moreover, water and gas are discharged from pellets in the process of melting in the injection molding apparatus. A part of the water and gas are discharged to the inner surface of the die when resin is injected into the die. The present invention has a structure wherein water and gas discharged from pellets in the process of melting in the injection molding apparatus and water and gas discharged to the inner surface of the die when resin is injected into the die are released. Furthermore, this invention is provided with an apparatus to remove harmful objects in water and gas at the gas exhaust passage where gas is discharged to the atmosphere. Thus, harmful objects are not discharged to the atmosphere. Therefore harmful objects such as objects that generate dioxin included in resin are not discharged to the atmosphere.

In case of using undried resin pellets, it is preferable to dry pellets to some extent before feeding to the injection molding apparatus. The present invention is provided with a heater which utilizes hot gas discharged in the process of melting in the injection molding apparatus. It is preferable to arrange first and second heaters as the heater. The second heater is placed at the pellet feeding passage at the injection molding apparatus side.

Pellets fed to the injection molding apparatus have cushion pressure when compressed by the screw. It is possible to arrange the range of fluctuation of the cushion pressure to be 5 mm±0.5 mm at most.

Pellets are automatically fed because the pellet feeding passage is under decompression. Moreover, the pellet feeding passage and the gas exhaust passage are connected to one decompression system. This simplifies the pellet feeding and gas exhausting system.

Said method for injection molding according to the present invention only needs to have each process. Therefore the order of each process is not limited to this order, and it is possible to adopt various orders.

It will be understood that the present invention is not limited to the embodiments and covers various changes and modifications within the spirit and scope of the invention.

As described above, the invention can be applied to not only an injection molding apparatus wherein resin is melted in the cylinder and injected from its end under pressurization but also any apparatus which is not named an injection molding apparatus wherein resin is melted in the cylinder and injected from its end under pressurization.

The injection molding products include various molding products such as electronic components and machine components.

What is claimed is:
1. An injection molding system comprising:
an injection molding apparatus injecting melted resin into a die, the die being placed forward of one end of the injection molding apparatus;
an air feeder for feeding at least air into the injection molding apparatus through a mouth arranged at an end of the injection molding apparatus opposite to the one end of the injection molding apparatus;

a resin pellet feeding passage for feeding resin pellets into the injection molding apparatus, the resin pellet feeding passage feeding the pellets into the injection molding apparatus at a location spaced apart from where the mouth feeds the at least air into the injection molding apparatus;

a pellet feeding regulator for controlling a feed of the resin pellets from the resin pellet feeding passage into the injection molding apparatus;

a pellet exhaust gas passage for passing moisture and exhaust gas which are generated when the resin pellets melt in the injection molding apparatus; and a decompressor connected to the exhaust gas passage for exhausting the moisture and the exhaust gas from a pellet feeding passage side to an outside of the injection molding apparatus.

2. An injection molding system comprising:

an injection molding apparatus injecting melted resin into a die, the die being placed forward of one end of the injection molding apparatus;

an air feeder for feeding at least air into the injection molding apparatus through a mouth arranged at an end of the injection molding apparatus opposite to the one end of the injection molding apparatus;

a resin pellet feeding passage for feeding resin pellets into the injection molding apparatus, the resin pellet feeding passage feeding the pellets into the injection molding apparatus at a location spaced apart from where the mouth feeds the at least air into the injection molding apparatus;

a pellet feeding regulator for controlling a feed of the resin pellets from the resin pellet feeding passage into the injection molding apparatus;

a pellet exhaust gas passage for passing moisture and exhaust gas which are generated when the resin pellets melt in the injection molding apparatus;

a decompressor connected to the exhaust gas passage for exhausting the moisture and the exhaust gas from a pellet feeding passage side to an outside of the injection molding apparatus; and a device for preventing the moisture and the exhaust gas which pass through the gas exhaust passage from contacting the resin pellets passing through the pellet feeding passage, with the moisture and the exhaust gas passing through a space outside the pellet feeder.

3. An injection molding system comprising:

an injection molding apparatus injecting melted resin into a die, the die being placed forward of one end of the injection molding apparatus;

an air feeder for feeding at least air into the injection molding apparatus through a mouth arranged at an end of the injection molding apparatus opposite to the one end of the injection molding apparatus;

a resin pellet feeding passage for feeding resin pellets into the injection molding apparatus, the resin pellet feeding passage feeding the pellets into the injection molding apparatus at a location spaced apart from where the mouth feeds the at least air into the injection molding apparatus;

a pellet feeding regulator for controlling a feed of the resin pellets from the resin pellet feeding passage into the injection molding apparatus;

a pellet exhaust gas passage for passing moisture and exhaust gas which are generating when the resin pellets melt in the injection molding apparatus;

a decompressor connected to the exhaust gas passage for exhausting the moisture and the exhaust gas form a pellet feeding passage side to an outside of te injection molding apparatus; and a removing apparatus placed at the exhaust gas passage.

4. A resin pellet feeding unit comprising:

a device for automatically feeding pellets with a vacuum interception valve, the device and the valve being disposed to intercept a passage between a pellet storage tank and other pellet storage;

a resin pellet feeding passage for feeding resin pellets into an injection molding apparatus;

a pellet feeding regulator for controlling a feed of the resin pellets from the resin pellet feeding passage into the injection molding apparatus;

an exhaust gas passage for passing moisture and exhaust gas which are generated when the resin pellets melt in the injection molding apparatus; and a decompressor connected to the exhaust gas passage for exhausting the moisture and the exhaust gas from a pellet feeding passage side to an outside of the injection molding apparatus.

5. A resin pellet feeding unit comprising:

a device for automatically feeding pellets with a vacuum interception valve, the device and the valve being disposed to intercept a passage between a pellet storage tank and other pellet storage;

a resin pellet feeding passage for feeding resin pellets into an injection molding apparatus;

a pellet feeding regulator for controlling feed of the resin pellets from the resin pellet feeding passage into the injection molding apparatus;

an exhaust gas passage for passing moisture and exhaust gas which are generated when the resin pellets melt in the injection molding apparatus;

a decompressor connected to the exhaust gas passage for exhausting the moisture and the exhaust gas from a pellet feeding passage side to an outside of the injection molding apparatus; and a device for preventing the moisture and the exhaust gas which pass through the exhaust gas passage from contacting the resin pellets passing through the pellet feeding passage.

6. A resin pellet feeding unit comprising:

a device for automatically feeding pellets with a vacuum interception valve, the device and the valve being disposed to intercept a passage between a pellet storage tank and other pellet storage;

a resin pellet feeding passage for feeding resin pellets into an injection molding apparatus;

a pellet feeding regulator for controlling a feed of the resin pellets from the resin pellet feeding passage into the injection molding apparatus;

an exhaust gas passage for passing moisture and exhaust gas which are generated when the resin pellets melt in the injection molding apparatus;

a decompressor connected to the exhaust gas passage for exhausting the moisture and the exhaust gas from a pellet feeding passage side to an outside of the injection molding apparatus; and a removing apparatus placed at the exhaust gas passage.

7. An injection molding system comprising:

an injection molding apparatus injecting melted resin into a die, the die being placed forward of one end of the injection molding apparatus;

an air feeder for feeding at least air into the injection molding apparatus through a mouth arranged at an end of the injection molding apparatus opposite to the one end of the injection molding apparatus;

a resin pellet feeding passage for feeding resin pellets into the injection molding apparatus, the resin pellet feeding passage feeding the pellets into the injection molding apparatus at a location spaced apart from where the mouth feeds the at least air into the injection molding apparatus;

a pellet feeding regulator for controlling a feed of the resin pellets from the resin pellet feeding passage into the injection molding apparatus;

a pellet exhaust gas passage for passing moisture and exhaust gas which are generated when the resin pellets melt in the injection molding apparatus;

a decompressor connected to the exhaust gas passage for exhausting the moisture and the exhaust gas from a pellet feeding passage side to an outside of the injection molding apparatus; and a device for preventing the moisture and the exhaust gas which pass through the gas exhaust passage from contacting the resin pellets passing through the pellet feeding passage, with the moisture and the exhaust gas passing through a space outside the pellet feeder, wherein the degree of decompression of said decompressor is at least one selected from among about 40 Kpa (300 torr) or more, about 70 Kpa or more, and about 80 Kpa to 95 Kpa.

* * * * *